(12) United States Patent
Colussi et al.

(10) Patent No.: US 6,575,028 B2
(45) Date of Patent: Jun. 10, 2003

(54) AUTO-CLEANING OIL-GAUGE FOR AXLE-ENDS OF VEHICLES

(75) Inventors: Rafael A. Colussi, Santa Fe (AR); Néstor J. Vénica, Santa Fe (AR)

(73) Assignee: Col-Ven S.A., Sante Fe (AR)

( * ) Notice: Subject to any disclaimer, the term of this patent is extended or adjusted under 35 U.S.C. 154(b) by 0 days.

(21) Appl. No.: 09/804,374

(22) Filed: Mar. 12, 2001

(65) Prior Publication Data

US 2002/0124648 A1 Sep. 12, 2002

(51) Int. Cl.⁷ .............. G01F 23/02; F16C 13/00

(52) U.S. Cl. .............. 73/323; 73/324; 73/327; 384/544; 384/589

(58) Field of Search .......... 73/323, 324, 327; 384/544, 589

(56) References Cited

U.S. PATENT DOCUMENTS

| | | | | |
|---|---|---|---|---|
| 4,704,039 A | * | 11/1987 | Ide ............... | 384/464 |
| 5,025,764 A | * | 6/1991 | Kobayashi et al. ...... | 123/198 |
| 5,328,275 A | * | 7/1994 | Winn et al. ......... | 384/472 |
| 5,366,300 A | * | 11/1994 | Deane et al. ......... | 384/585 |
| 5,443,316 A | * | 8/1995 | Deane et al. ......... | 384/485 |
| 5,584,949 A | * | 12/1996 | Ingram .............. | 152/417 |

* cited by examiner

*Primary Examiner*—Hezron Williams
*Assistant Examiner*—Katina Wilson
(74) *Attorney, Agent, or Firm*—Davidson, Davidson & Kappel, LLC

(57) ABSTRACT

An oil-gauge for the axle-end of a vehicle includes a transparent or translucid lid (15) for inspecting the level of oil in a chamber (13) housing the wheel-mounting bearings. A disk partition (23) is bolted to the inside of the lid to form a shallow subchamber (25). The disk is provided with orifices for oil level in the subchamber to follow the oil level in the main chamber. The visible surface (29) of the disk is painted white and the subchamber houses one or more loose elements (31) to wipe the inside of the lid clean.

13 Claims, 3 Drawing Sheets

US 6,575,028 B2
AUTO-CLEANING OIL-GAUGE FOR AXLE-ENDS OF VEHICLES

FIELD OF THE INVENTION

The present invention relates to oil-gauges for mounting to a vehicle's hub to provide a visual indication of the level of oil lubricating the axle-end bearings. More particularly, the oil meter of the invention provides a direct display indicating whether oil needs to be added.

BRIEF DESCRIPTION OF THE PRIOR ART

In large and medium-sized vehicles, whether passenger or cargo, it is of particular importance to control that there is enough oil in the hub to adequately lubricate the bearings on each axle end. FIGS. 1A and 2A respectively represent a perspective view and a cross-section view of a conventional aluminum hub 11 known on the market under a STEMCO trademark. The hub 11 includes a chamber 13 housing ball-bearings for supporting a wheel system on the axle end and oil for lubricating the bearings (not illustrated). The oil-gauge includes a glass (i.e. acrylic) lid 15 mounted to the outer end of the hub 11 in a plane perpendicular to the axle 17. The glass 15 seals the outer end of the chamber and is bathed by the oil inside, providing a direct visual display of the oil level inside the chamber 13. The lid 15 has a pair of circular bosses 19A, 19B molded on the glass surface thereof to provide a visual indication of the oil level relative to maximum and minimum levels, respectively. The glass 15 is further gauged with appropriate indicia 21A, 21 B, such as "FULL" and "ADD", respectively, the latter enabling a driver or operator to immediately asses a need of replenishing oil in the chamber 13.

The above-described oil-gauge is designed to indirectly protect the wheel bearings by providing the driver with a simple and direct means of checking oil level and avoiding that a vehicle wheel run dry, which may result in the bearings locking and thereafter a potentially serious accident.

However, we have found on the road that the conventional gauge display is frequently difficult to read because the oil level is hard to see for lack of contrast, which is further exacerbated as the lid becomes soiled on the inside and therefore has to be dismantled to be cleaned. This operation requires unscrewing.several bolts and we have found that drivers generally find it easier to change the glass 15 rather than to clean it, which is an unnecessary waste.

SUMMARY OF THE INVENTION

An object of the invention is an improved oil-gauge for mounting to a hub on the end of an axle which requires less frequent cleaning or replacing in lieu thereof.

Another object of the invention is an oil-gauge less susceptible to soiling inside the oil chamber.

A further object of the invention is an oil-gauge for mounting to a hub on the end of an axle to provide an improved display of the oil level in the hub.

To attain these and other objects and advantages, a portion of the chamber of an oil gauge as generally referred to hereinabove is axially partitioned from the rest of the chamber housing the bearings by an annular disk or the like mounted inside of and parallel to the outer transparent or translucid lid, to form a subchamber in the annular space between the disk and the outer lid wherein oil may flow outwardly from the rest of the chamber, thereby enhancing the visibility of the level of oil in the chamber through the lid. The surface facing the lid outwardly may be coated with white paint or the like to provide a more marked contrast to further enhance the oil level visibility.

Furthermore, the outer subchamber may be dimensioned to be relatively narrow in the axial direction and contain one or more loose elements inside to produce a wiping effect on the inside of the lid during movement, thereby helping to keep the lid inside clean.

BRIEF DESCRIPTION OF THE DRAWINGS

These and other characteristics and details of the object of this invention and the manner it can be developed, implemented and put into practice may be better understood from the following detailed description of an example embodiment illustrated in the attached drawings, wherein.

PREFERRED EMBODIMENT OF THE INVENTION

Figure 1:
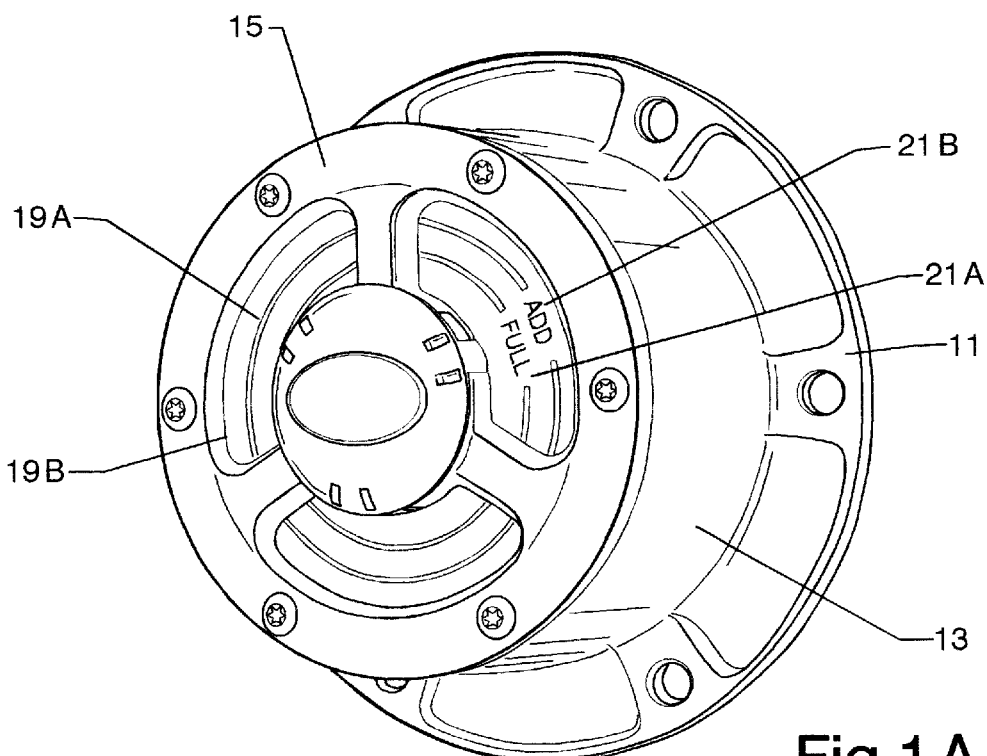
FIG. 1A is a perspective view of a prior art hub.
FIG. 1B is a perspective view of a hub including an oil-gauge according to a preferred embodiment of the present invention.
Figure 1:
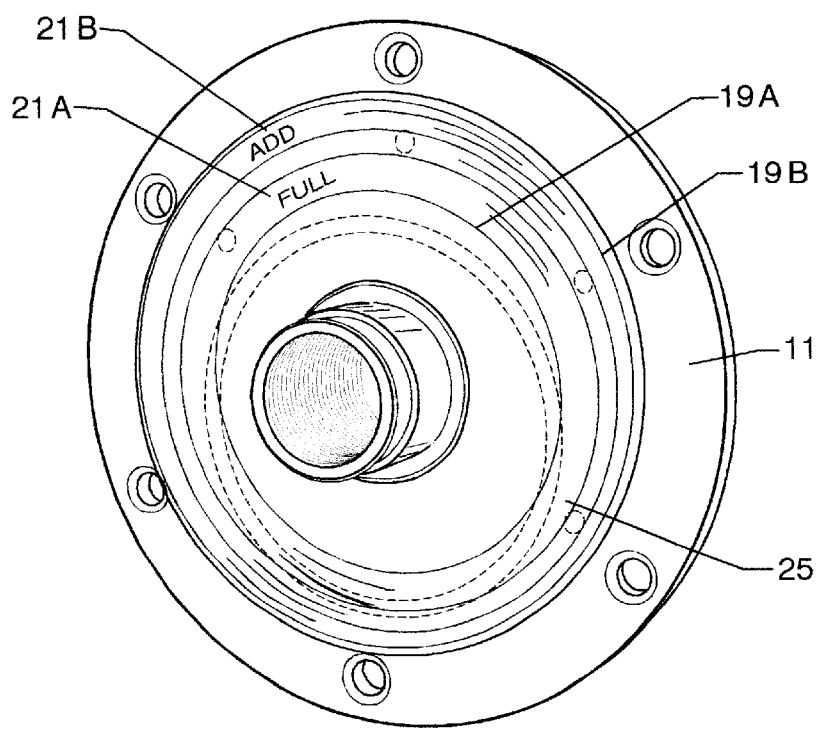
Figure 2A:
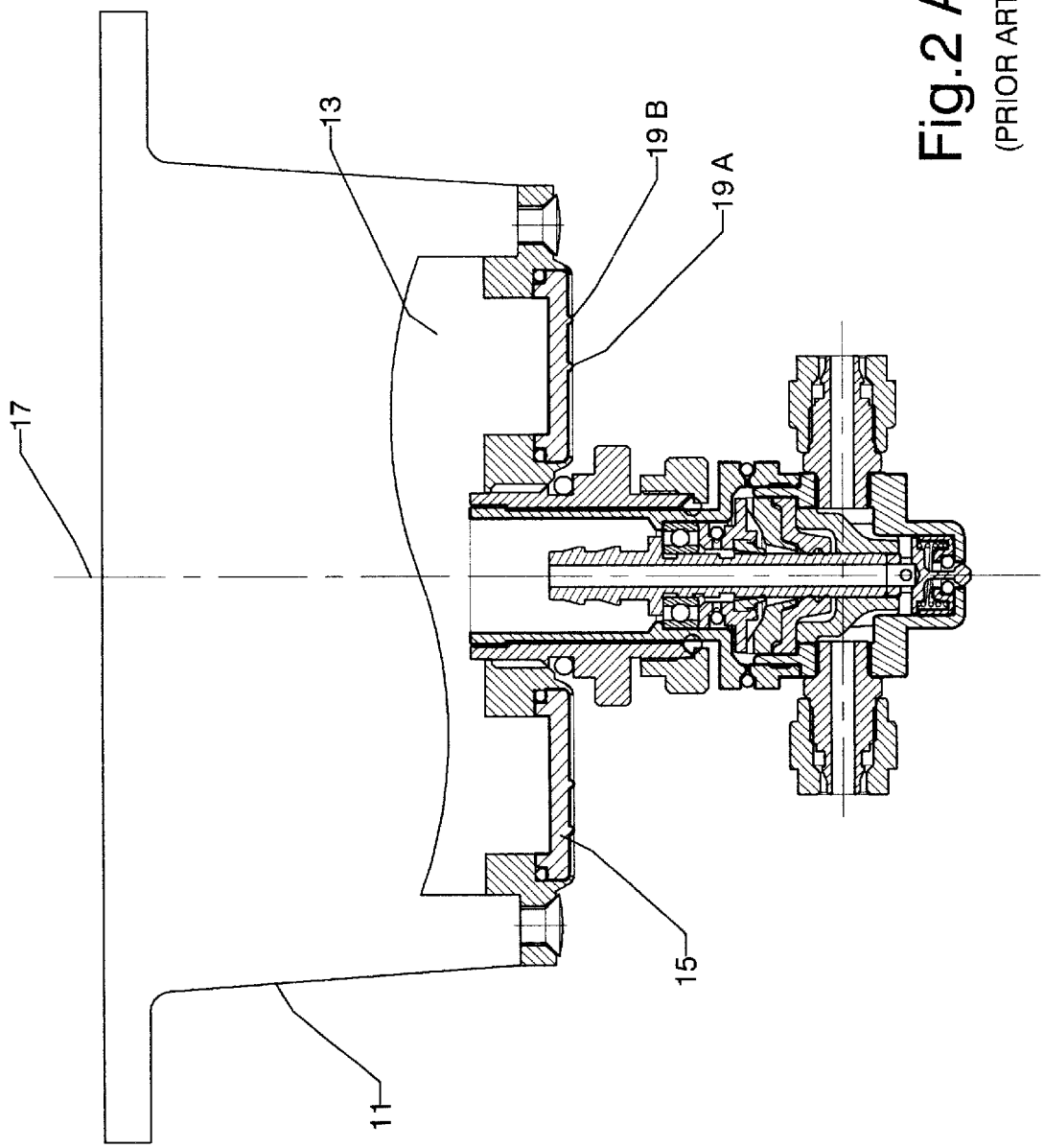
FIG. 2A is a cross-sectional view of a prior art hub.
Figure 2:
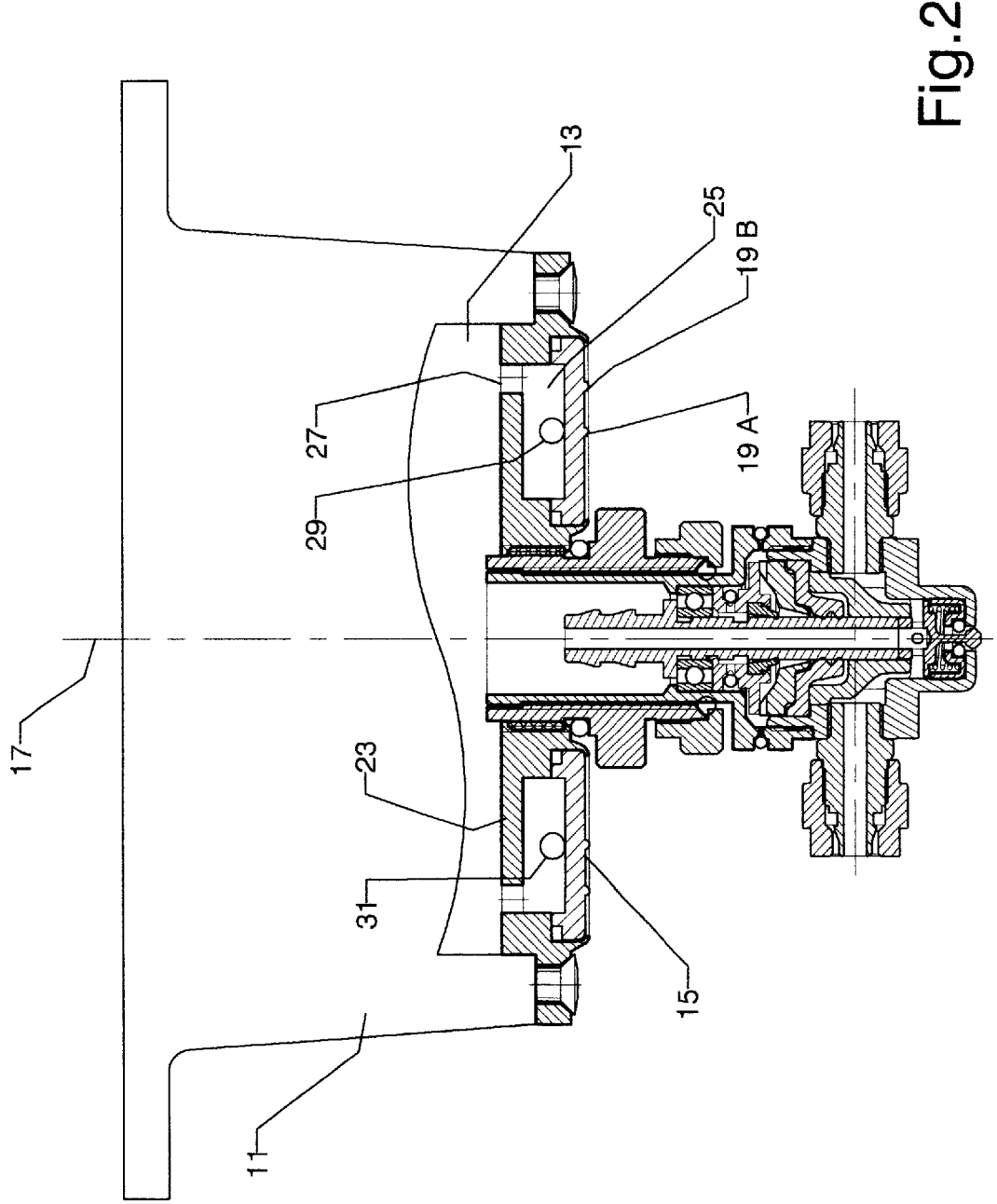
FIG. 2B is a cross-sectional view of an axle end including the hub and oil-gauge of FIG. 1.

FIGS. 1B and 2B illustrate an improved oil-gauge according to the invention. Parts similar or equivalent to the prior oil-gauge illustrated in FIGS. 1A and 2A are identified with like numerals for ease of comparison in order to more fairly bring out the novel features and advantages of the present invention.

The cross-section of a hub 11 mounted by means of a pair of ball or, preferably, roller bearings (not illustrated) on the end of an axle of a motor vehicle, such as in a truck, a trailer or a large bus, is shown in FIG. 2B. The hub 11 includes a chamber 13 housing roller-bearings for supporting a wheel or a pair of wheels (not illustrated) on the axle end and oil for lubricating the bearings. The oil-gauge includes a lid 15 of acrylic material (generally referred to as "glass") mounted to the outer end of the hub 11 in a plane perpendicular to the axle 17. The lid 15 seals the outer end of the chamber 13 and is bathed by the oil inside, to provide a direct visual display of the oil level inside the chamber 13. The lid 15 has a pair of circular bosses 19A, 19B molded on the outer acrylic surface thereof to provide a visual indication of the oil level relative to maximum and minimum threshold levels, respectively. The outer surface of the lid 15 may be further gauged with appropriate indicia 21A, 21B, such as "FULL" and "ADD", respectively, to enable a driver or operator to assess whether there is a need of replenishing oil in the chamber 13.

In the gauge of the present invention, an annular disk 23 bolted to the lid 15 generally closes off a minor, outer subchamber 25 from the rest of the chamber 13, thereby providing a relatively shallow axial depth of the oil in the subchamber 25.

A plurality of passages or through orifices 27 arranged generally in a circular pattern centered on the axle on an outer diameter of the disk 23 enable oil to flow in and out of subchamber 23 from the main chamber 13, thereby providing for the oil level in the subchamber 25 to follow the oil level in the main chamber 13, even at lower than minimum levels of oil in the chamber 13. The diameter of the minimum-level boss 19B is generally inside or at the most level with the diameter of the pattern of orifices 27 communicating oil between the chambers.

Thus, the level of oil in the chamber 13 may be visibly assessed by reading the oil level in the subchamber 25 through the looking lid 15. The outer surface 29 of the disk 23, i.e. the disk surface facing the lid 15 across the subchamber may be coated with white paint to enhance visibility of the oil level inside the subchamber 25. Of course, paint of any other suitable color or light-reflective coating may alternatively be applied to the disk surface 29.

In order to assist in keeping the inside surface of the transparent or translucid lid 15 clean, an O-ring 31 or other suitable element(s) may be loosely placed inside the subchamber 25 to rub against the inside of the lid 15 and wipe it clean during rotation of the hub 11.

Various modifications, variations and/or additions can be made to the embodiment described herein, within the scope of the invention as set forth in the appended claims.

We claim:

1. An oil-gauge for mounting to a hub at the end of an axle, said hub including a chamber, said chamber housing rotary bearing means mounted to said axle and a level of oil liquid for lubricating said bearings, said oil-gauge including an at least partly transparent or translucid lid for mounting on an outer end of said hub in a plane substantially perpendidular to said axle, said lid closing said chamber at said hub outer end such that the inside of said lid is bathed by said oil liquid, whereby said lid provides a visual display of the level of said oil liquid in said chamber; wherein said oil-gauge further comprises means for enhancing the visibility of the level of said oil liquid in said chamber through said lid, and said oil-level visibility enhancing means comprises:

means for dividing said chamber into an inner subchamber housing said bearing means and an outer subchamber between said chamber dividing means and said lid, and means for enabling the oil level in said outer subchamber to follow the oil level in said inner subchamber.

2. An axle-end oil-gauge according to claim 1, wherein said chamber dividing means comprises an annular disk mounted inside said chamber, substantially parallel to said lid, thereby dividing said chamber into said inner subchamber and said outer subchamber.

3. An axle-end oil-gauge according to claim 2, wherein said level following enabling means comprises passage means for communicating oil from said inner subchamber to said outer subchamber.

4. An axle-end oil-gauge according to claim 3, wherein said passage means comprises a plurality of orifices passing through said disk and arranged in a circular pattern centered on said axle.

5. An axle-end oil-gauge according to claim 4, wherein said plurality of orifices are arranged on a radius greater than a radius defining a low level for said oil liquid in said chamber.

6. An axle-end oil-gauge according to claim 2, wherein said disk includes a surface facing said lid, said surface including means for enhancing the visibility of the level of said oil liquid in said outer subchamber through said lid.

7. An axle-end oil-gauge according to claim 6, wherein said disk lid-facing surface is covered with a light-reflecting coat.

8. An axle-end oil-gauge according to claim 1, wherein said disk lid-facing surface is painted substantially white.

9. An axle-end oil-gauge according to claim 2, wherein said disk is bolted to said lid.

10. An axle-end oil-gauge according to claim 1, wherein said outer subchamber further houses at least one loose element for wiping the inside surface of said lid during rotation of a wheel mounted to said axle.

11. An axle-end oil-gauge according to claim 10, wherein said outer subchamber has a relatively narrow axial depth and said loose element includes a rubber-like O-ring arranged around said axle end.

12. An axle-end oil-gauge according to claim 1, wherein said lid is made of acrylic material.

13. An axle-end oil-gauge according to claim 1, further including at least one circle visibly marked on said lid in concentric relationship to said axle to indicate a threshhold level below which oil liquid should be added to said chamber.

* * * * *